INVENTOR
Robert Adler
BY Hugh H. Drake
ATTORNEY

INVENTOR
Robert Adler
BY Hugh W. Drake
ATTORNEY

United States Patent Office 3,275,943
Patented Sept. 27, 1966

3,275,943

DUAL OUTPUT CHANNEL ELECTRON BEAM PARAMETRIC AMPLIFIER WITH NOISE ELIMINATION

Robert Adler, Northfield, Ill., assignor to Zenith Radio Corporation, a corporation of Delaware Filed Apr. 10, 1959, Ser. No. 805,530
4 Claims. (Cl. 330—4.7)

The present invention is related to an amplifying system. More particularly it has to do with amplifying systems employing parametric amplifiers.

Recent times have seen an exciting flurry of industry activity in the field of parametric amplifiers. At least one version of the parametric amplifier is perhaps twenty-five or more years old, although that version never reached apparent commercial practicability. Much more recently, a tremendous amount of effort has been expended as a result of dissemination of information relating to more useful forms of parametric amplifiers. In the presently more popular varieties, the active amplification device may be of several different varieties. Such devices may include such elements as semi-conductors, ferro-magnetic materials and electron beams.

Each different one of these various kinds of parametric amplifiers has its own special characteristics. On the other hand, certain fundamental principles are in common to all parametric amplifiers. The present application is directed to parametric amplification systems which may employ one or more of these different kinds of parametric amplifiers.

In the parametric amplification process, signal energy to be amplified is translated by a circuit having a variable energy storage parameter. The latter is modulated or varied in value by signal energy at a frequency different from that of the input signal. It has become customary to speak of the process as one of applying a pump signal to the variable parameter.

Amplification is produced when the variable parameter is modulated in proper phase relationship with respect to the input signal so that additional energy derived from the pumping signal is transferred to the signal undergoing amplification. Signal energy is also developed at an idler frequency equal to a modulation product between the frequencies of the pump and input signals. In the output of the device, energy components may ordinarily be found at both the input and idler frequencies.

One major reason for the great interest in parametric amplifiers is their capability of operating with extremely low noise figures. In certain parametric amplifiers heretofore disclosed, it has been found possible to remove a substantial amount of noise from the signal translation channel. Somewhat remarkable success has been achieved in this area and parametric amplifiers have been produced which have noise figures far better than more conventional amplifiers also capable of providing substantial signal gain. However, in the presently known devices where noise elimination has been attempted, complete success has not been achieved; that is, the theoretical zero noise figure of the parametric amplifier has not been realized in practice.

One difficulty in attempting to eliminate excess noise in present parametric amplifiers stems from noise contribution of the idler signal. It has been pointed out before that the noise contribution of the latter may be reduced, at least in degree, by increasing the amount of frequency separation between the idler and signal frequencies through judicious selection of the pump frequency with respect to the desired signal frequency. However, in many instances it is most undesirable to place this limitation upon the apparatus.

Accordingly, it is a general object of the present invention to provide a new and improved parametric amplifier system in which the foregoing difficulties with respect to excess noise are overcome.

Another object of the present invention is to provide a new and improved parametric amplification system in which the idler frequency noise contribution is eliminated from the signals utilized by the ultimate receiver.

A further object of the present invention is to provide a new and improved parametric amplification system in which noise components of different phase characteristics appearing in the system are canceled.

One detailed object of the present invention is to provide a parametric amplification system featuring extremely low noise figures and which may utilize a variety of well-known parametric amplifiers without the necessity of modifying the latter.

A parametric amplification system constructed and operated in accordance with the present invention includes a pair of parametric amplifiers having input, pumping and output circuits. Pumping signal energy is applied to each of the pumping circuits with mutually opposite phase relationship. Coupled to the input circuits are a first signal translating network in push-pull relationship and a second translating signal network in parallel relationship with said amplifiers. Finally, amplified signal energy is derived from the output circuits. The output network is arranged to deliver for utilization the desired amplified information and to cancel signal energy translated through the amplifiers from one of the first and second signal translating networks other than that to which the input signal is coupled. The inventive features include tuning of the signal translating networks, noise elimination, and delivery of the output signal at the same frequency as the input signal.

The features of the present invention which are believed to be novel are set forth with particularity in the appended claims. The organization and manner of operation of the invention, together with further objects and advantages thereof, may best be understood by reference to the following description taken in conjunction with the accompanying drawings, in which:

Figure 6:
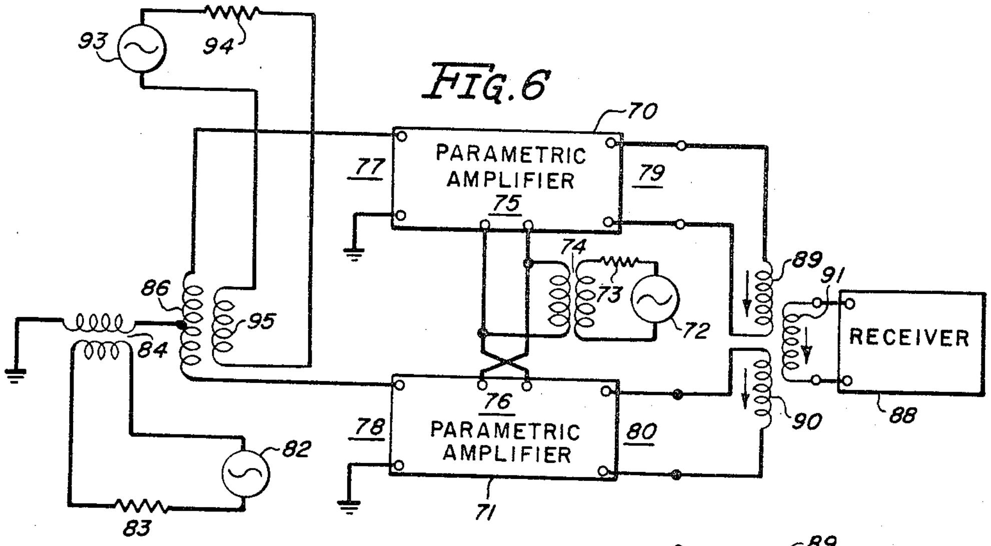
FIGURE 6 is a schematic diagram of one embodiment of the present invention.

FIGURE *6a* is a variation of FIGURE 6; and

Figure 7:
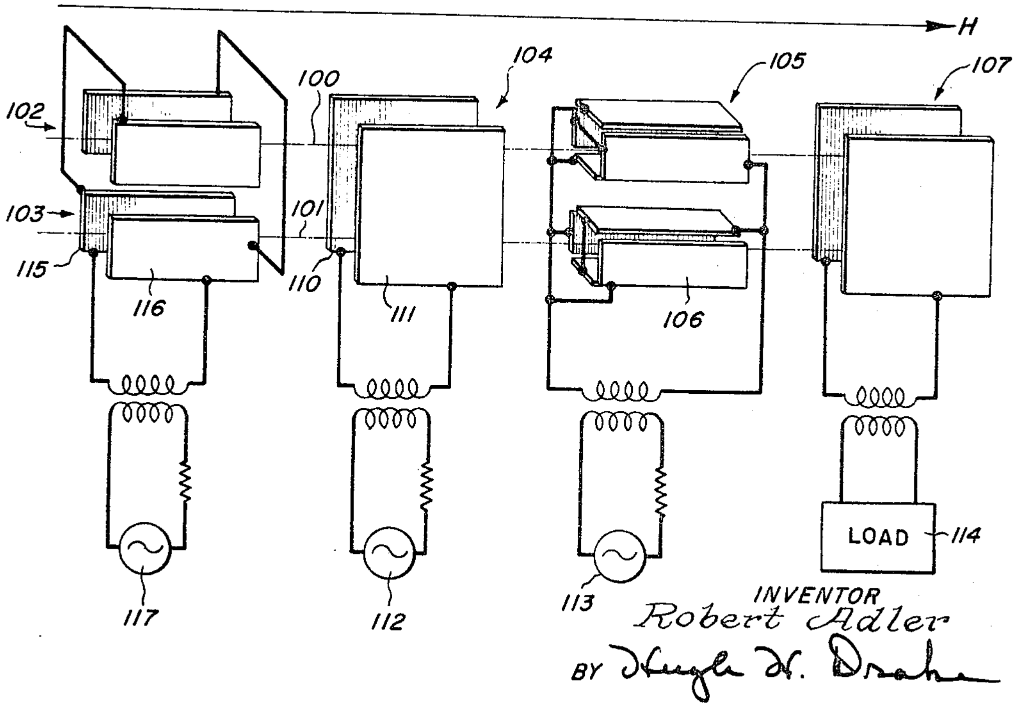

FIGURE 7 is a schematic diagram of another embodiment of the present invention.

While the present invention in its broader aspects is directly applicable to any of several parametric amplifier varieties, it is sufficient for purposes of explaining the parametric amplification process to refer to one typical variety which has been successfully constructed and operated and well received by industry. Thus, the process will presently be illustrated as realized in a specific electron beam amplifier.

The particular amplifier selected for purposes of illustration is one described and claimed in the copending application of Glen Wade, Serial No. 747,764, filed July 10, 1958, now abandoned in favor of co-pending continuation application Serial. No. 289,792, filed June 20, 1963, both entitled Parametric Amplifier, and assigned to the same assignee as the present application. This specific version of the electron beam parametric amplifier is premised upon basic principles disclosed in the copending application of Robert Adler, Serial No. 738,546, filed May 28, 1958, now Patent No. 3,233,182, entitled Electronic Signal Amplifying Methods and Apparatus, and assigned to the same assignee as the present application which is a continuation-in-part of application Serial No. 738,546. Certain basic principles are also disclosed in an article by Robert Adler entitled, "Parametric Amplification With a Fast-Electron Wave," appearing in the Proceedings of the IRE, volume 46, No. 6, June 1958. The specific amplifier herein shown for illustrative purposes is described and explained in detail in an article by Robert Adler et al. entitled, "A Low-Noise Electron-Beam Parametric Amplifier" appearing in the Proceedings of the IRE, volume 46, No. 10, for October 1958.

Generally speaking, the illustrative device includes an electron source from which an electron beam is projected along a path. Spaced along the beam path are several components including an input modulator responsive to applied signal energy for modulating the beam. Subsequent to modulation, the beam is subjected to the action of a modulation expander after which signal energy is extracted from the beam modulation in an output coupler. As pointed out in the aforesaid applications and articles, such a parametric amplifier is unilateral; that is, it translates signal energy only from the input coupler or modulator to the output coupler. This is inherently so because of the discrete spacing along the beam of these sections with the electrons moving only, and hence carrying signal energy only, from the input section toward the output section.

As mentioned above, a parametric amplifier is a device in which a reactance which is part of a transmission system is varied periodically by an external energy source. The electron beam parametric amplifiers include means for establishing an electron resonant frequency for the electrons passing through the modulation expander together with means responsive to a driving or pumping signal for developing a field having a restoring force component varying in proper phase with respect to the signal motion to impart energy thereto.

Figure 1:
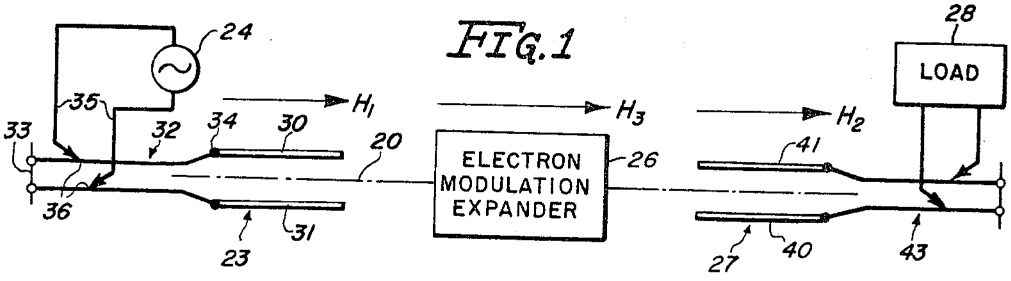
FIGURE 1 is a schematic diagram of one general form of parametric amplifier.

As illustrated in FIGURE 1, an electron beam is projected along a reference path 20. The electron beam source may be entirely conventional and preferably includes the usual cathode together with suitable focusing and accelerating electrodes for developing a well-defined beam of electrons. An electron beam collector may be disposed at the end of the path remote from the electron source and conventionally includes an anode biased at a positive potential with respect to the cathode.

Disposed in a first portion of beam path 20 is an input modulator 23 coupled to a signal source 24. Modulator 23 is an electron coupler capable of imparting energy to the electron beam in response to energy received from source 24. The signal intelligence is represented on the beam as electron motion. Within modulator 23 and beyond, an electron-resonant frequency is established for this electron motion. In a longitudinal-field device this resonant condition is related to the well-known space-charge waves developed in response to modulating signal energy while in the present transverse-field device this resonant condition is a function of a focusing field to which the beam is subjected.

Following input modulator 23 and disposed alongside a portion of beam path 20 beyond the modulator is an electron modulation expander 26. On beyond expander 26 is a demodulator 27 coupled to a suitable load 28. Operation of demodulator 27 is generally the reverse of that of modulator 23. Motion of the electrons in the beam interacts with demodulator 27 to transfer energy from the beam to the demodulator from where it is fed to load 28 by suitable coupling circuitry.

In the illustrated apparatus, energy components existing in the beam as it passes through the modulator are removed. Such energy components constitute excess noise which otherwise would be present in the derived output signal. This noise is carried by the electron beam and appears as energy components which are added to the signal components; typical of such electron beam noise is that originating in the electron beam source.

To the end of removing such signal component energy, modulator 23 is constructed to interact with the fast electron wave. It is known that interaction between electron beams and circuits placed alongside such beams can take at least two different forms. Two distinct fundamental electron waves exist in an electron beam at a given frequency. One travels faster than the electron stream and the other travels slower.

A simplified interpretation of electron wave action may be developed by considering the electron beam as subject to a restoring force derived from the space charge in longitudinal-field tubes and the focusing field in transverse-field tubes. This restoring force enables each electron in the beam to oscillate about its normal position in the beam at the previously mentioned electron-resonant frequency, often referred to as the reduced plasma frequency in longitudinal-field tubes and the cyclotron frequency or transverse-resonant frequency in transverse-field tubes.

Motion of the electrons in the beam at the electron-resonant frequency, once excited, persists until disturbed. To excite this motion the velocity of wave propagation on the circuit must be such that the electrons, traveling at a different velocity, "see" a signal field at their own resonant frequency. This will occur for a circuit wave traveling either at the fast electron wave velocity or at the slow electron wave velocity. Interaction between electron motions and signal fields leads to different results in the two cases. For a circuit wave velocity corresponding to the slow electron wave velocity, phase relationships are such that in-phase signals on the beam in the circuit tend to augment each other and produce exponential amplification; this is the mechanism conventionally used in traveling-wave tubes. At the same time, out-of-phase signals on the beam and the circuit tend to suppress each other and produce exponential attenuation.

When the circuit wave velocity corresponds to the fast electron wave velocity, the phase relationships are such that when the signal in the circuit augments the motion of the electron beam that same motion has the effect of reducing the signal on the circuit, and vice versa. As a result of this interrelationship, a signal traveling on the circuit will eventually disappear from the circuit and at the same time appear on the beam. Subsequently the signal will reappear on the circuit. Conversely, a signal originating on the beam is transferred to the circuit, and further on, is transferred back to the beam. This is a standing-wave phenomenon analogous to the standing waves observed on coupled transmission lines. However, the interchange mechanism is not limited to the use of transmission lines. It is known to the art that lumped structures may be arranged to interact with the beam in a similar manner.

One aspect of this phenomenon of beam-and-circuit signal interchange is the existence of points along the beam where, at a given signal frequency, all of the signal impressed upon the circuit is transferred to the beam as modulation of the specific character of beam interaction employed and all of the energy originally present in the beam as modulation of the same character is transferred to the circuit. This interchange of energy between the beam and the circuit is limited to the specific mode of electron motion which constitutes the faster of the two possible electron waves at a particular frequency. In order then to take advantage of this fast electron-wave noise absorption phenomenon, input modulator 23 is preferably constructed and loaded so that all fast-wave energy components originally on the beam are transferred to the modulator circuit while the energy from signal source 24 is transferred to the beam.

Several known energy transfer mechanisms, including for the case of transverse electron motion transmission lines and deflection plates spaced alongside the beam, may be utilized to modulate the beam with energy from source 24, as discussed more fully in the aforementioned copending applications. As illustrated, modulator 23 includes a pair of deflector plates 30 and 31 located individually on opposite sides of beam path 20. For coupling signal source 24 to modulator 23, a transmission line 32 having one end 33 shorted is coupled at its other end 34 to deflectors 30 and 31. A transmission link 35 is tapped at 36 onto transmission line 32 at a position adjusted to match the impedance of source 24 to that presented by deflectors 30 and 31. Transmission line 32 is effectively a quarter wave length at the frequency of the signal from source 24.

To establish an electron resonant frequency approximately equal to the signal frequency along the first portion of beam path 20, the space between electrodes 30 and 31 is subjected to a magnetic field of a strength sufficient to establish for electrons in the beam a cyclotron frequency approximately equal to that of the source signal. To this end, deflectors 30 and 31 are placed within a solenoid indicated schematically by arrow $H_1$.

Modulator 23 interacts efficiently with the fast electron wave but may also react with the slow electron wave on the beam. While lumped electrodes 30 and 31 interact inefficiently with the slow electron wave, such interaction with the slow wave is minimized, theoretically to zero, by making the effective electrical length of electrodes 30 and 31 equal to an integral multiple of the slow wavelength.

With the input modulator properly loaded by a suitable matching resistance, it extracts the fast-wave noise signal from the beam; this match is obtained by adjusting the position of taps 36 for minimum noise transmission to load 28. Thus, deflector electrodes 30 and 31 together with magnetic field $H_1$ cause signal energy from source 54 to be interchanged with energy originally contained in the beam and specifically with the fast-wave noise energy.

Demodulator 27 may for convenience be identical with modulator 23 although other appropriate electron couplers may be utilized. Accordingly, it includes receptor electrodes 40 and 41 which preferably are identical with electrodes 30 and 31. The portion of the electron beam path disposed between electrodes 40 and 41 is likewise subjected to a magnetic field of sufficient strength to establish for electrons in the beam a cyclotron frequency approximately equal to the frequency of electron signal motion within the demodulator. As in modulator 23, this field may be created by an ordinary solenoid coil encircling electrodes 40 and 41 as indicated by the arrow labeled $H_2$. In the present instance, it is most convenient to dispose the entire length of the apparatus within a single solenoid producing a constant homogeneous magnetic field throughout the beam path. However, separate solenoids may be disposed when different field strengths are required as when demodulator 27 is of a type of beam interaction device different from that of modulator 23.

Load 28 is coupled to demodulator 27 through a transmission line section 43 in a manner similar to that described above with respect to source 24 and modulator 23. Operation of demodulator 27 is the reverse of that of modulator 23. Motion of the electrons in the beam reacts with demodulator 27 to transfer energy from the beam to the demodulator from where it is fed to load 28 by the coupling circuitry.

Figure 2:
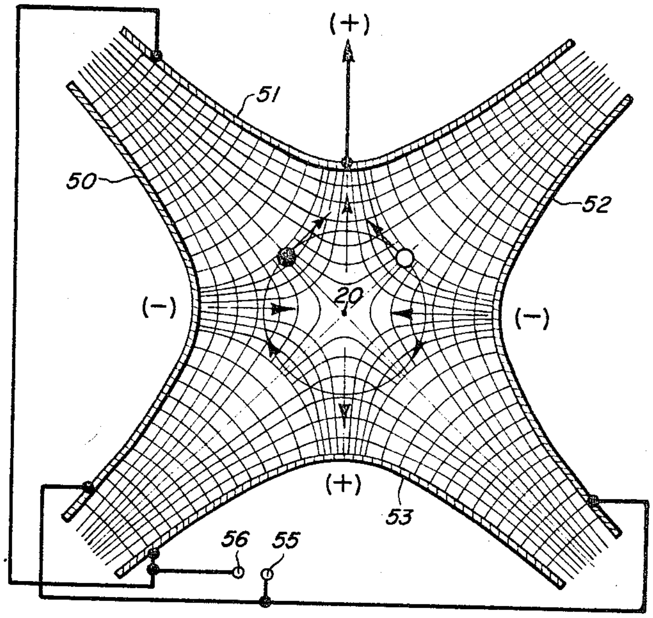
FIGURE 2 is a diagram in field plot of a modulation-expander electrode structure employed in a specific form of parametric amplifier.

Parametric amplification is accomplished in expander 26 by an electrode structure to which a pumping signal is applied. The region within the electrode structure is subjected to a homogeneous magnetic field $H_3$ of a strength, as fields $H_1$ and $H_2$, establishing cyclotron resonance at approximately the signal frequency and at one-half the pump frequency. The electrode structure creates a time-varying inhomogeneous field as a result of which the stiffness along each of two orthogonal axes of the electron suspension created by field $H_3$ is periodically varied in phase with electron motion components so as to impart energy to the electron motion. While, as disclosed more fully in the aforesaid copending applications, various electrode arrangements may be employed in the expander for creating the time-varying inhomogeneous field, a quadrupole electrode structure is in this instance employed, as illustrated in FIGURE 2. Four electrodes 50–53 are symmetrically disposed around reference path 20. Each electrode 50–53 has the shape of an equilateral hyperbola and the electrodes are individually disposed with their intermediate portions facing the beam path and with their terminal portions projecting outwardly therefrom. Oppositely disposed electrodes 50 and 52 are coupled to one input terminal 55, and the other pair of oppositely disposed electrodes 51 and 53 are coupled to a second input terminal 56. The pumping or driving signal is applied to terminals 55, 56.

With reference to FIGURE 2, assume that the electron beam flow is into the paper and that the sense of the helical electron motion produced by the input signal modulator is clockwise. The polarities indicated on the drawing correspond to an instant when the top and bottom electrodes, 51 and 53, are positive and when the other two electrodes are negative. The large horizontal and vertical arrows illustrate the forces exerted upon electrons in the four corresponding regions. Observe that the electron on the top left, shown solid, encounters a force which accelerates it along its clockwise path. The other electron, shown on the top right as an empty circle, is subjected to a force which decelerates its orbital motion. It will be observed that there is no field at all from the electrodes in the center and that the field intensity increases linearly away from the center. Thus, the forces exerted upon an orbiting electron are proportional to the radius of the circle in which it moves as a result of which the radius increases or decreases exponentially.

Analysis reveals that the results are the same when the circle describing the orbital motion is off-center with respect to the electrode configuration; the exponential increase or decrease of the radius of the circle depends only on the non-homogeneity of the field.

Figure 3:
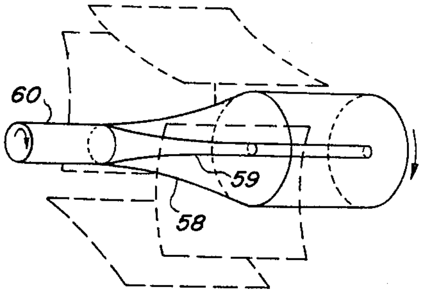
FIGURE 3 is a perspective view illustrating the action of the electrode structure shown in FIGURE 2.

FIGURE 3 depicts the curved surfaces 58 and 59 generated by the motion of electrons through the expander with respective best and worst phase with respect to gain. All electrons enter from the left along the same cylindrical surface 60; the radius of the electrons having the proper phase for maximum amplification becomes very large while the other radius becomes negligibly small.

Figure 4:
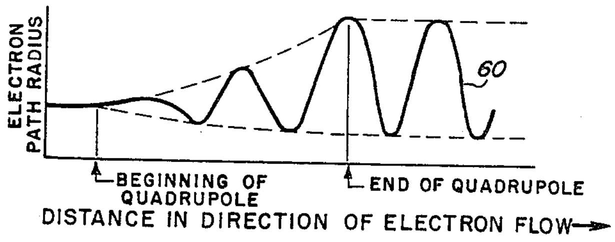
FIGURE 4 is a graph illustrating a signal characteristic useful in explaining the operation of the electrode structure shown in FIGURE 2.

For an input signal which is accurately synchronized at a frequency one-half the pump frequency, a specific phase condtion is maintained, for example, that of maximum gain. When the input signal frequency differs slightly, conditions of maximum and minimum gain occur alternately. This is indicated in FIGURE 4 in which the electron path radius is measured along the ordinate and the distance in the direction of electron flow is measured along the abscissa. On the average, the resultant output signal is larger than the input signal because the exponential growth always outweighs the exponential drop. The output signal contains a beat as indicated by curve 60. The beat wave has round tops and sharply pointed dips and consists of two sine wave components, one at the signal frequency and the other at an idler frequency equal to the difference between the pump and signal frequencies.

It may be noted that curve 60 is obtained by adjusting the signal frequency so that it differs from one-half the pump frequency. The pump frequency and the strength of magnetic field $H_3$ are the same as optimized for the condition in which the signal frequency equals one-half the pump frequency. Gain is produced by an averaging process taken over many electrons entering with every possible phase; this mechanism remains in effect regardless of signal frequency. As a result, the amplifying process does not limit the bandwidth which in the device illustrated is determined only by the input and output couplers. By using different couplers, either fast or slow electron waves may be produced at any signal frequency; the individual electrons which make up these waves still orbit at the cyclotron frequency established by magnetic field $H_3$ and their motion is amplified by applying a pumping signal at twice the cyclotron frequency established by that field.

Figure 5:
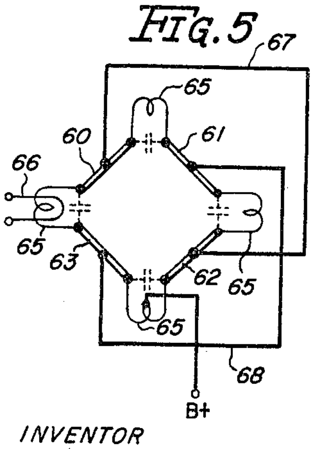
FIGURE 5 is a schematic diagram of an alternative electrode structure and circuitry therefor.

FIGURE 5 is illustrative of a simple quadrupole configuration utilizing plate-like electrodes 60–63 disposed circumferentially around beam path 20. Inductors 65 are coupled individually between adjacent ends of each pair of electrodes 60–63. Each of inductors 65 is of a value parallel resonant, with the capacity presented across the points of connection, at the pump signal frequency. The pump signal source is coupled to the quadrupole by means of a transmission line 66 link coupled to one of inductors 65. In order to correlate the D.C. potential on the expander with respect to other electrodes in the device and to permit proper focusing, a D.C. source B+ is coupled to the mid-point of another one of inductors 65. The pump or driving signal generator is matched to transmission line 66 by means of a suitable network. Various suitable coupling networks are discussed in more detail in the aforementioned parent application.

When the expander of FIGURE 5 is energized with a pump signal which is twice the cyclotron frequency established by magnetic field $H_3$, electrons following a helical orbit representing signal motion are subjected to forces amplifying that motion in the same manner as previously explained with respect to FIGURE 2. The orbital motion preferably is confined to the central portion of the expander field space and is centered about reference path 20. In order to enforce operation of the expander in the pi-mode, opposite electrodes 60, 62 and 61, 63 are electrically tied together by leads 67 and 68, respectively. By the pi-mode is meant operation so that opposite electrodes are in equal phase while adjacent ones are in counter phase.

Having described certain basic principles and one structural form of a parametric amplifier, and having referred to other copending applications and to prior publications wherein further discussion is available, certain general features of parametric amplification should be noted. Since an electron beam device has been utilized as an example of the kind of devices to which the invention relates, the following discussion will frequently refer to the process as it takes place in electron beam amplifiers. However, the more basic principles are applicable to various such amplifiers.

During operation of a parametric amplifier, a signal energy componet exists at an indler frequency $\omega_2$ which is the difference between pump signal frequency $\omega_3$ and input signal frequency $\omega_1$. In the electron beam device, the idler frequency exists as a component of electron motion. With the driving signal frequency equal to twice the input signal frequency, the idler frequency is equal to the input signal frequency. So operated, the restoring field $H_3$ in the expander effectively provides a resonant suspension at the input signal frequency and also provides resonance for the electron motion component at the idler frequency. When these two frequencies are the same, the two motions become undistinguishable.

However, useful amplification is obtained even though there is considerable variation from the condition in which the pump frequency is exactly equal to twice the input signal frequency, as hereinbefore pointed out. When the pump frequency differs a sufficiently large amount from twice the input signal frequency, the cyclotron field may no longer be relied on to support the idler frequency. Where necessary, an external tuned circuit may be used to resonate the idler signal frequency energy. A suitable circuit for this purpose is illustrated and described in more detail in the aforesaid parent application.

Analysis reveals that parametric amplifiers, including the electron motion expander discussed for purposes of illustration, resemble frequency converters in many respects. The pump signal at frequency $\omega_3$ may be thought of as the local oscillator frequency. In these amplifiers, an input signal at frequency $\omega_1$ appears in the output not only directly at that frequency but also at the idler or differency frequency $\omega_2$. For convenience of notation, the direct signal will hereinafter be designated $\omega_{11}$ and the converted signal will be designated $\omega_{12}$. At the same time, any input signal energy at the idler frequency $\omega_2$ will appear in the output directly as a signal designated by $\omega_{22}$ and by conversion to the input signal frequency $\omega_1$ as a signal designated by $\omega_{21}$. In a device as thus far discussed, there may be no way of determining at the output whether the original input signal was of frequency $\omega_1$ or $\omega_2$.

With the desired signal at frequency $\omega_1$ and observing the output signal at that frequency, noise at the idler frequency $\omega_2$ is converted to frequency $\omega_1$ and appears in the output at that frequency. In the device of FIGURE 1, when the driving signal frequency is approximately twice the desired input signal frequency so that the idler and signal frequencies are close together, a single fast wave interaction device for the input signal serves to remove noise from the beam at both the desired and the idler frequencies. When the driving signal frequency is substantially different from twice the desired frequency, so that the idler signal frequency differs substantially from the desired signal frequency, the fast-wave noise on the beam may be removed therefrom by an appropriate coupling network matched to the beam at the idler frequency. Such a network for the idler frequency may be completely separate from the input signal modulator or, alternatively, the latter may be equipped with an additional mesh so that the modulator is also matched to the beam at the idler frequency.

One feature of the parametric frequency conversion process is that levels of signal or noise energy are changed in proportion to frequency when converted from idler to signal frequency or vice versa. When the driving signal frequency is sufficiently high that the idler frequency is substantially higher than the signal frequency, noise at the idler frequency is attenuated sufficiently by the conversion process that it may in some instances be ignored. On the other hand, when the driving frequency is only slightly higher than the signal frequency, in apparatus as thus far described, the idler frequency noise is effectively amplified in its conversion to the signal frequency. Accordingly, a relatively low frequency signal, in this instance applied to an input coupler designed to interact at the idler frequency, is substantially amplified; this amplification occurs in addition to the parametric amplification of signals at both the idler and signal frequencies.

In a system wherein the ultimate receiver or load responds only to one of the input and idler frequencies, output signals of only two of the four principal combinations mentioned above are of primary concern. For example, with a receiver tuned to select signals of frequency $\omega_1$, only the direct signal $\omega_{11}$ and the converted signal $\omega_{21}$ are of significance. Even though the input coupling network is properly matched as described earlier in order to remove noise at the desired signal frequency it may insufficiently remove noise contributed by the idler circuit.

In accordance with the present invention, noise energy is removed from any of a variety of parametric amplifiers by means of a system which includes at least two parametric amplifying mechanisms having a particular mutual relationship. By establishing certain operative relationships between the pair of amplifiers, any one desired output signal component may be selected while the others are either rejected or canceled.

The invention therefore contemplates a pair of parametric amplifiers 70 and 71 as illustrated schematically in FIGURE 6. It also contemplates that pump signal energy at frequency $\omega_3$ from a source 72 be impressed in mutually opposite phase relationship upon amplifiers 70, 71. Accordingly, source 72, including its source resistance 73, is coupled through a transformer 74, tuned to frequency $\omega_3$, to the pump circuit 75 of amplifier 70 in one phase and in reverse phase to pump circuit 76 of amplifier 71.

Amplifiers 70 and 71 have respective input circuits 77 and 78 and also have respective output circuits 79 and 80. Input signal energy at frequency $\omega_1$ is applied in parallel to input circuits 77 and 78 from a signal source 82 having a source resistance 83. In order to couple the input signal energy to the input circuits in parallel relationship, source 82 is connected across the primary winding of a transformer 84 the output winding of which is connected between a point of reference potential and the center of an inductor 86. One end of inductor 86 is coupled to one input terminal of input circuit 77, while the other end of inductor 86 is coupled to the corresponding terminal of input circuit 78. The other input terminals of input circuits 77 and 78 are connected to the point of reference potential. Energy derived from source 82 is thereby impressed across input circuits 77 and 78 in like phase.

Signal energy at frequency $\omega_2$ may be applied in push-pull to input circuits 77 and 78. Thus, a source 93 having a source resistance 94 is coupled across a winding 95 inductively coupled to winding 86. Signal energy from source 93 is thereby impressed upon input circuits 77 and 78 in push-pull relationship.

In accordance with the preferred embodiment of the present invention the output circuits 79 and 80 are coupled in parallel relationship to a receiver 88. To this end, output circuits 79 and 80 are coupled respectively across a pair of primary windings 89 and 90 of a transformer having a secondary winding 91 across which receiver 88 is connected. Windings 89 and 90 are wound in series inductive relationship so as to be coupled to receiver 88 in parallel.

In operation, at any instant one amplifier will be in its optimum-gain condition for an input signal $\omega_1$ while the other is in minimum-gain condition at that frequency. The direct signals $\omega_{11}$ appear in each of output circuits 79 and 80 in the same relative phase. Accordingly, the direct signals are added by the parallel coupling network and fed to receiver 88 which in this instance is receptive of frequency $\omega_1$. However, the converted signals $\omega_{21}$ appear individually with mutually opposite phase in output circuits 79 and 80 and are therefore canceled by the parallel combination of the output coupling network. Thus, by separating the signal and idler components into different parts of the input circuitry, instead of carrying them in a common circuit, the noise contribution of the idler component at the desired signal frequency is minimized.

When the single-ended or unbalanced coupling network for source 82 also serves as a noise sink, unbalanced noise components are extracted from input circuits 77 and 78. Thus, when input circuits 77 and 78 are in the form of fast wave electron beam interaction devices, the unbalanced signal coupling network is properly matched to the input circuits, as explained earlier, to extract fast wave noise from the beam. However, only noise having a phase characteristic corresponding to that of the input coupling network may be removed in this manner.

Of course, a noise signal consists of a random assortment of frequencies at all random phases. This may be represented as energy consisting of balanced and unbalanced noise components. A noise sink in the unbalanced signal coupling circuit fed by source 82 can only extract unbalanced noise components. Balanced noise components will produce components in the output of the system in correct phase to be added. Similarly, a balanced coupling circuit can extract only balanced noise components.

In accordance with a further aspect of the present invention, the noise component uncanceled by the signal input coupling network is removed by another input coupling network of the other phase character. To this end, the coupling network including inductors 95 and 86 is arranged to constitute a noise sink for the balanced noise components. Thus, in the system utilizing an electron beam fast wave parametric amplifier, the balanced input coupling network is tuned to the frequency $\omega_2$ and is matched to the input coupling circuits 77 and 78 in order to extract balanced fast wave noise components appearing on the beam.

A practical way of including a noise sink in an input coupling network is simply to couple it to a cooled termination. This may be done by cooling resistance 94 as by immersing noise source 93 in a substance such as liquid nitrogen. Of course, theoretically zero noise would be generated by the noise source and perfect noise elimination obtained with the source cooled to a temperature of absolute zero.

In actual practice, either of the balanced or unbalanced input coupling networks may be coupled to a source of the desired signal and the other terminated. The network conveying the signal to be amplified is constructed as explained above to extract or serve as a sink for noise having the character of that circuit. The other coupling network then serves to reduce noise represented as a component having the opposite phase characteristic. The output circuit is constructed to add the desired output signals and cancel the undesired signals at the frequency being received.

Figure 6A:
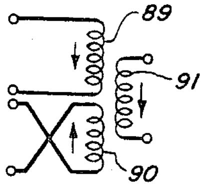

In applications wherein the system is to be used for purposes such as frequency conversion, it may be desired to derive at the output different signals than are obtained with an output coupling network arranged in parallel relationship. For example, the output coupling network may be arranged to couple receiver 88 to output circuits 79 and 80 in push-pull relationship as depicted in FIGURE 6*a*. Of course, this may be accomplished simply by connecting inductor 89 across output circuit 79 as before and reversely connecting inductor 90 across output circuit 80. So arranged, and with the receiver tuned to $\omega_1$, the converted signal $\omega_{21}$ is fed to receiver 88 while the direct signal is canceled by the push-pull output circuit.

A structurally simple electron beam parametric amplifier constructed in accordance with the present invention is illustrated in FIGURE 7. In this system a pair of electron beams are projected along adjacent paths 100 and 101. The entire region through which the beam paths extend is subjected to a magnetic field indicated by the arrow labeled H and of a strength sufficient to establish a selected cyclotron or resonant frequency for electron motion.

In a first portion of the beam paths are a pair of electron couplers 102 and 103 associated respectively with the electron beams traversing paths 100 and 101. Following electron couplers 102 and 103 is another electron coupler 104 in common to both paths 100, 101. Next along the beam paths are a pair of quadrupole electrode systems 105 and 106 respectively encircling beam paths 102 and 103. Finally, another electron coupler 107 is coupled in common across beam paths 102 and 103.

Viewing only the bottom half of the electron beam device shown in FIGURE 7 and for the moment neglecting electron coupler 103, this portion of the system is identical with the parametric amplifier described in connection with FIGURES 1 to 5. The input modulator includes deflector plates 110 and 111 spaced on opposite sides of beam path 101 and coupled to an input signal source 112 at frequency $\omega_1$. The expander includes four quadrupole electrodes having opposite pairs coupled to a signal source 113 at the pump signal frequency $\omega_3$.

Finally, the output receptors forming electron coupler 107 are coupled and matched to a load 114. The operation of this portion of the device, taken alone, is identical with that discussed before with respect to FIGURES 1 through 5.

Also coupled to the beam path is electron coupler 103 comprising deflectors 115 and 116 coupled only to the electron beam traversing path 101. Deflectors 115 and 116 are coupled and matched to a signal source 117 at frequency $\omega_2$. In the manner explained above, source 117 together with its indicated internal resistance may be a cooled termination in order that electron coupler 103 functions in the manner previously described to extract noise components appearing on the beam traversing path 101 at frequency $\omega_2$. Alternatively, source 117 may represent the source of the signal to be amplified with source 112 representing a cooled termination. In either case, the source supplying the desired signal energy is also properly matched to the electron beam in order to extract beam noise at the desired signal frequency.

The upper half of the electron beam device in FIGURE 7 is identical in construction with the just described lower half execpt for electrical interconnections. As noted, input coupler 104 and output coupler 107 are in common to both beams. Thus, couplers 104 and 107 are coupled in parallel relationship to both beams. With respect to its noise elimination function, coupler 104 serves to extract the unbalanced components of signal energy from the beam. Signals having the same relative mutual phase relationship are added in coupler 107 and are fed to load 114.

The interconnections between expanders 105 and 106 are reversely connected so that the pump signal is applied in relative mutual phase opposition. Thus, the side of the signal coupling network connected to the horizontal electrode elements of expander 106 is connected to the vertically aligned elements of expander 105, while the other side of the coupling network is connected to the remaining element pairs of each of the expanders. Accordingly, the two expanders are driven in mutual phase opposition.

Input couplers 102 and 103 are reversely interconnected to constitute means for impressing on the beam in push-pull relationship a signal from source 117. As shown in the drawing the electrode on the far side of beam path 103 is connected to the electrode on the inner side of beam 102 and vice versa.

The operation of the amplifying system shown in FIGURE 7 will be readily understood from the preceding description of FIGURE 6. For example, with input signal energy at frequency $\omega_1$ or $\omega_2$ applied to source 112, the direct signal $\omega_{11}$ or $\omega_{23}$, is delivered to load 114, while the respective converted signal $\omega_{21}$ or $\omega_{12}$ from source 117 is canceled by addition in the output coupling network. The input signal coupling network serves to extract beam noise having its character of coupling relationship while the other circuit cancels beam noise of its different phase characteristic and its noise contribution depends upon its source temperature.

The principles of parametric amplification have been reviewed in order to present a better understanding of the present invention. A particular electron beam device has been discussed and reference has been made to certain copending applications and prior publications in order to provide a concrete example of the nature of one form of parametric amplification. Apparatus has been disclosed which functions in a unique manner to cancel or remove various noise components arising from the process of parametric amplification. This system may employ two independent parametric amplification devices or, as has also been shown and described, may be incorporated into a combined device having certain common elements and associated circuitry. In use, the device permits amplification at and over a wide range on either side of at least two specific frequencies which are characteristics of the particular apparatus at hand. Any of several signal components developed in the output circuitry may be selected, rejected or canceled in accordance with the particular application. Noise of either or both the balanced and unbalanced character may be canceled or reduced to the end of removing excess noise appearing at the desired output frequency.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. An amplifying system comprising: means for projecting a pair of electron beams individually along adjacent predetermined paths; means, including an electron coupler disposed adjacent and in common to said paths, for coupling signal energy in parallel to said beams; means, including a pair of reversely interconnected electron couplers individually disposed adjacent respective ones of said paths, for coupling signal energy to said beams in push-pull; means for terminating one of said coupling means in a noise sink tuned to a frequency $\omega_2$; means for applying input signal energy of a frequency $\omega_1$ to the other of said coupling means; means for impressing pumping signal energy of a frequency $\omega_3$ equal to $\omega_1$ plus $\omega_2$ upon each of said beams but with mutually opposite phase relationship; and means coupled to said beams for deriving amplified input signal energy therefrom.

2. An amplifying system comprising: means for projecting a pair of electron beams individually along adjacent predetermined paths; means, including an electron coupler disposed adjacent and in common to said paths, for coupling signal energy in parallel to said beams; means, including a pair of reversely interconnected electron couplers individually disposed adjacent respective ones of said paths, for coupling signal energy to said beams in push-pull; means for terminating one of said coupling means in a noise sink tuned to a frequency $\omega_2$; means for applying input signal energy of a frequency $\omega_1$ to the other of said coupling means; means for impressing pumping signal energy of a frequency $\omega_3$ equal to $\omega_1$ plus $\omega_2$ upon each of said beams but with mutually opposite phase relationship; means, including an electron interaction device, for deriving and combining amplified input signal energy derived from said beams.

3. An amplifying system comprising: means for projecting a pair of electron beams individually along adjacent predetermined paths; means, including an electron coupler disposed adjacent and in common to said paths, for coupling signal energy in parallel to said beams; means, including a pair of reversely interconnected electron couplers individually disposed adjacent respective ones of said paths, for coupling signal energy to said beams in push-pull; means for terminating one of said coupling means in a noise sink tuned to a frequency $\omega_2$; means for applying input signal energy of a frequency $\omega_1$ to the other of said coupling means; means for impressing pumping signal energy of a pumping frequency $\omega_3$ equal to $\omega_1$ plus $\omega_2$ upon each of said beams but with mutually opposite phase relationship; means, including an electron coupler disposed adjacent said paths and in common thereto, for deriving and combining in parallel amplified input signals carried by said beams.

4. An amplifying system comprising: means for projecting a pair of electron beams individually along a pair of adjacent paths; means, including an electron coupler disposed in common with and adjacent said paths, for interacting with fast electron-wave energy on said beam; means, including a pair of electron couplers reversely connected and disposed individually adjacent respective ones of said paths, for interacting in push-pull with fast-wave signal energy on said beams; means for terminating one of said coupling means in a noise sink for fast-wave signal energy at a frequency $\omega_2$; means for applying input signal energy of a frequency $\omega_1$ to the other of said coupling means; means, including an electron interaction device for impressing pumping signal energy of a frequency $\omega_3$ equal to $\omega_1$ plus $\omega_2$ on said beams with mutually opposite phase relationship, for amplifying fast-wave signal energy impressed upon said beams; and means coupled to said output circuits for deriving amplified fast-wave input signal energy therefrom.

References Cited by the Examiner

UNITED STATES PATENTS

| | | | |
|---|---|---|---|
| 2,629,782 | 2/1953 | Ring | 333—11 |
| 2,847,517 | 8/1958 | Small | 333—11 |
| 3,012,203 | 12/1961 | Tien. | |
| 3,045,189 | 7/1962 | Engelbrecht. | |
| 3,144,615 | 8/1964 | Engelbrecht. | |

OTHER REFERENCES

Heffner, "IRE Transaction on Microwave Theory and Techniques," January 1959, pages 83 to 91 (pages 88 and 89 relied on).

Danielson, "Journal of Applied Physics," January 1959, pages 8 to 15 (pages 13 and 14 relied on).

Louisell et al., "Proceedings of the IRE," April 1958, pages 707 to 716 (page 707 relied on).

Salzberg et al., "Proceedings of the IRE," June 1958, page 1303.

Adler et al., "Proceedings of the IRE," October 1958, pages 1756 to 1757.

ROY LAKE, *Primary Examiner.*

ELI J. SAX, BENNETT G. MILLER, *Examiners.*

D. R. HOSTETTER, *Assistant Examiner.*